UNITED STATES PATENT OFFICE.

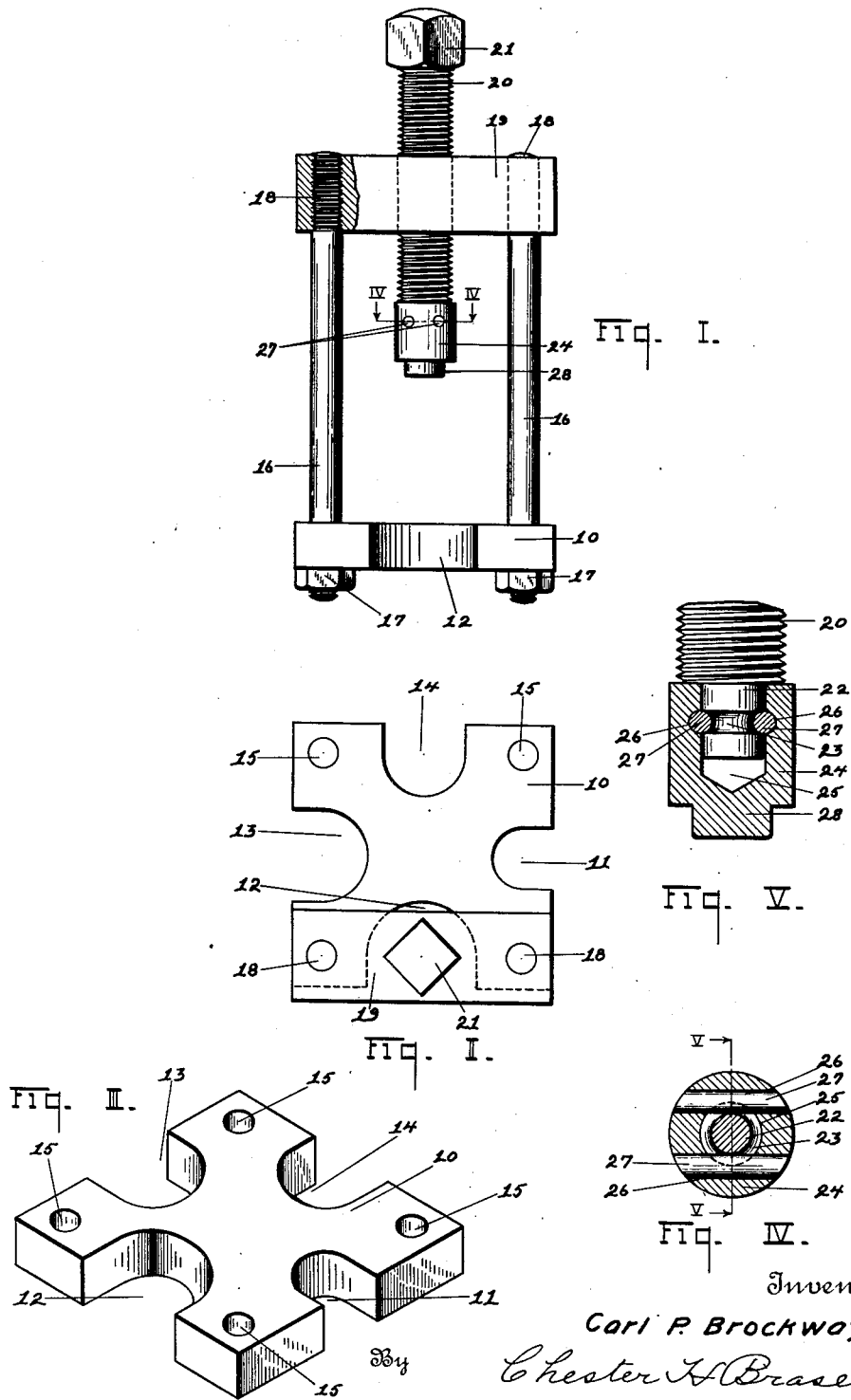

CARL P. BROCKWAY, OF TOLEDO, OHIO, ASSIGNOR TO THE WILLYS-OVERLAND COMPANY, OF TOLEDO, OHIO, A CORPORATION OF OHIO.

STEERING-WHEEL-SPIDER PULLER.

1,383,382.  Specification of Letters Patent.  Patented July 5, 1921.

Application filed October 5, 1917. Serial No. 194,906.

*To all whom it may concern:*

Be it known that I, CARL P. BROCKWAY, a citizen of the United States, residing at Toledo, in the county of Lucas and State of Ohio, have invented certain new and useful Improvements in Steering-Wheel-Spider Pullers, of which I declare the following to be a full, clear, and exact description.

This invention relates to improvements in tools for use in connection with automobiles in removing the steering wheel spider from the steering column, and for other similar uses.

The principal object of this invention is to provide an improved tool, which is useful for removing the steering wheel from the steering column, and which is so constructed, that it may, by simple and conveniently accessible adjustments, be so changed as to be used for steering wheels and steering columns of different sizes.

A further object of my invention is to provide an improved tool for removing the steering wheel, which is so constructed that its use will not injure the top of the steering column.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure I is a view in side elevation of a device constructed in accordance with my invention.

Fig. II is a top plan view of the device shown in Fig. I.

Fig. III is a perspective view of the base member of the device.

Fig. IV is a detail, sectional view, taken substantially on the line IV—IV of Fig. I, and Fig. V is a detail, sectional view, taken substantially on the line V—V of Fig. IV.

In the drawings, similar reference numerals refer to similar parts throughout the several views, and the sectional views are taken looking in the direction of the little arrows at the ends of the section lines.

Considering the numbered parts of the drawing, I have shown a tool for removing the steering wheel spider from the steering column of an automobile, which comprises a base member 10 preferably square, and provided on each side thereof with notches 11, 12, 13 and 14, which notches are semi-circular in form, and of different radii, so as to fit steering columns of different sizes. An opening 15 is provided in each corner of the base 10. A pair of posts 16 are provided, each having its lower threaded end inserted through one of the openings 15 and held in place by the nut 17 threaded on the lower threaded end of said post 16 on the under side of the base member 10. The upper ends of the posts 16 are threaded into the end of a cross bar 19 and said posts 16 are secured in openings 15 so chosen that the bar 19 will lie along one side of and parallel to one side of the base 10, as clearly shown in Fig. II of the drawing.

A screw 20 is provided, which is threaded through the central part of the bar 19, and has a head 21 by means of which the screw can be rotated. The lower end of the screw 20 is reduced at 22, and provided with an annular groove 23. A head 24 is provided, having a socket 25 therein receiving the reduced end 22 of the screw 20. Openings 26 are provided which pass transversely through the head 24, and in which are disposed pins 27, lying partially in said opening and partially in the groove 23 of the end 22 of the screw 20, so that said head 24 is in this manner swiveled on the end of the screw 20. The head 24 is provided with the reduced portion 28.

From the description of the parts given above, the operation of this device should be very readily understood. In removing a steering wheel spider from the steering column, the throttle and spark control head and levers are first removed, and the control rods are either removed, or dropped down so that they will be out of the way of the tool, when it is inserted in place. Base member 10 is so disposed that one of the notches, 11, 12, 13 or 14 is disposed around the steering column. In the drawing, the tool is shown set up for use with the notch 12 and, in use, the steering column lies in the notch 12, with the portion of the base 10, adjacent said notch, disposed beneath the steering wheel spider. The posts 16 extend up through the spider on either side of the steering column. The bar 19 is carried by the upper end of the posts 16 and the screw 20 is screwed down until the reduced portion 28 of the head 24 is disposed within the upper end of the hollow steering column with the head 24 resting on the end of said column. A further rotation of the screw 20 in the proper direction will exert a thrust against the end of the steering column, which will re-act through the bar 19, the posts 16 and the base 10, to pull the steering wheel spider from off the end of the column. In this manner, the spider can be easily removed from the column, without injuring the end thereof, since the head 24 may remain fixed relative to the column and the screw 20 turn relative to said head, which is swiveled on the end thereof.

Steering columns in use are not all of the same diameter, and hence I provide a tool, which may be readily changed so as to be used with a number of different sizes of steering columns. In order to change this tool over to use with a different size of column, the posts 16 are inserted in a different series of holes so that the bar 19 is supported in line with one or the other of the notches, 12, 13 or 14, as may be desired. In each case the operation is exactly the same.

I have shown and described this tool as particularly adapted for use in removing the steering wheel spider from the steering column of an automobile, but it will be apparent that its use is not limited to this particular instance, but that this same tool may be very successfully used for removing wheels, spiders, pulleys, and like elements from columns, rods, or shafts upon which they are mounted. This tool has been designed, however, with particular reference to the removing of the steering wheel spider from the steering column of an automobile.

While I have shown one embodiment of my invention it will be understood that I do not wish to be limited to the particular construction shown, but desire to cover all modifications which may fall within the scope of the appended claims.

Having thus described my invention, what I claim as new and desire to secure by Letters Patent, is:

1. A device of the class described, comprising a base member provided along its edges with a plurality of notches, a bar provided with a screw threaded therein, and means for supporting the bar in such a manner as to position the screw in line with any one of the various notches.

2. In a device of the class described in combination, a base member provided with a plurality of openings therein, a bar provided with a screw threaded therein, and means for operatively supporting the bar with the screw in line with any one of the various openings.

3. A device of the class described, comprising the combination of a base provided with a plurality of notches of different sizes, formed in the sides thereof; posts adapted to be supported by said base, in a plurality of positions, with reference to any one of said notches; a bar supported by the upper ends of said posts, and adapted to be brought in line with any one of said notches; a screw threaded through said bar in line with any one of said notches; and a head swiveled on the lower end of said screw.

4. In a device of the class described, in combination, a base member provided with a plurality of openings of different size formed therein, a bar provided with a screw inserted therein, and means for operatively supporting the bar relative to the base member with the screw in line with any one of the various openings.

In testimony whereof I affix my signature.

CARL P. BROCKWAY.